Patented Nov. 11, 1941

2,262,488

UNITED STATES PATENT OFFICE 2,262,488

SOLVENT

Johan Bjorksten, Chicago, Ill., assignor to Ditto, Incorporated, Chicago, Ill., a corporation of West Virginia No Drawing. Application November 15, 1940, Serial No. 365,802

4 Claims. (Cl. 41—31.6)

The invention relates to solvents and more particularly to solvent mixtures for use in duplicating processes wherein a copy sheet is moistened with the solvent mixture and applied to a master sheet containing characters or a design formed of soluble inks.

The solvents used in the above so-called spirit or direct process duplicating method must be good solvents for duplicating dyes such as the basic water and alcohol soluble dyes commonly used. They must spread instantly and uniformly on the copy paper and they must very rapidly evaporate to such an extent that the dye impression is fixed on the paper and further spreading or blurring is prevented. Furthermore, the solvents must not have an objectionable odor and must be non-toxic.

A duplicating fluid which answers the above requirement consists of ethyl alcohol containing a minor proportion of methyl alcohol, viz. 95% ethyl alcohol and 5% of methyl alcohol. This is a denatured alcohol of a type, however, which is not permitted for use and sale as a duplicating fluid or for like purposes where the fluid would be available to the general public. The addition of hydrocarbons such as benzol or gasoline to the ethyl alcohol and methyl alcohol mixture would satisfy Government requirements as to a denaturant but would give an objectionable odor which makes the fluid unsuitable for use and sale in the duplicating art.

I have discovered that when a volatile hydrocarbon fraction is used as denaturant in certain compositions, characterized by narrow, critical limits of glycol type solvents and of the denaturant, a composition is obtained which is denatured sufficiently to deter from abuse, yet when applied to paper on a duplicating machine does not have an objectionable odor.

While I do not wish to commit myself to any theory regarding the cause of this unexpected and advantageous result, it appears that when the liquid of this invention is applied to a porous paper sheet, such as is used for direct process duplicating, the relatively non-volatile glycol ingredient may form a film on the porous paper sheet which may exert a selective adsorption or retention on the hydrocarbon denaturant, causing this to remain in the paper rather than to evaporate, whereby no objectionable odor is given off when this liquid is used for duplication purposes.

To illustrate the invention, the following examples may be given:

Example I

| | Per cent |
|---|---|
| Ethyl alcohol | 90 |
| Ethylene glycol mono-methyl ether | 9 |
| A petroleum distillate boiling between 50° and 130° C | 1 |

Example II

| | Per cent |
|---|---|
| Ethyl alcohol | 85 |
| Water | 5 |
| Diethylene glycol mono-ethyl ether | 5 |
| Aviation gasoline | ⅜ |
| Methyl alcohol | 4⅝ |

Example III

| | Per cent |
|---|---|
| Ethyl alcohol | 80 |
| Diethylene glycol | 10 |
| Propyl alcohol | 3 |
| Water | 5 |
| Aviation gasoline | 1.6 |
| Perfume | .4 |

Example IV

| | Per cent |
|---|---|
| Ethyl alcohol | 60 |
| Diethylene glycol monoethyl ether | 8 |
| Ethylene glycol | 2 |
| Ethylene glycol monoethyl ether | 5 |
| Water | 8 |
| Propyl alcohol | 4 |
| Aviation gasoline | ⅜ |
| Methyl alcohol | 12⅝ |

Example V

| | Per cent |
|---|---|
| Ethyl alcohol | 82 |
| Water | 10 |
| Diethylene glycol monoethyl ether | 4 |
| Ethylene glycol monomethyl ether | 2 |
| A hydrocarbon fraction obtained by distillation of vapor phase cracked gas oil and boiling substantially between 60° and 120° C | ⅜ |
| Methyl alcohol | 1⅝ |

Example VI

| | Per cent |
|---|---|
| Ethyl alcohol | 80 |
| Water | 9 |
| Diethylene glycol monoethyl ether acetate | 5 |
| A hydrocarbon fraction obtained by distillation of a heterogeneous hydrocarbon compound produced by catalytic polymerization at elevated temperatures and pressures of the gases obtained by cracking of petroleum | ½ |
| Methyl alcohol | 5½ |

From the foregoing examples, which have been given to illustrate and not in any sense of limitation, it is apparent that a wide variety of glycol solvents may be used in a percentage between 5% and 15% by volume, and that any hydrocarbon or mixture of hydrocarbons soluble in the alcohol-glycol mixtures and comprising a substantial hydrocarbon portion boiling in the range 50° to 130° C. may be used in a percentage between ⅜% and 1.6% by volume.

For the purposes of this application, I understand the term "glycol type solvent" to include polyhydric water soluble alcohols, such as ethylene glycol, diethylene glycol, glycerin, di and poly hydroxy derivatives of lower aliphatic hydrocarbons such as isobutylene and the like, and water or alcohol soluble mono and poly ethers and esters of such alcohols.

In addition to the hydrocarbon materials mentioned above by way of illustration, any of the following hydrocarbons or mixtures thereof would also be suitable: 2, 2, 4 trimethyl pentane, 3 methyl hexane, 2, 3, 7, 6 tetramethyl octane, 4, 7 dipropyldiene, 4 methyl pentane-1, 2, 3, 3 tri methyl butene-1, 2 ethyl decene-1, hexadiene 1, 4, 3 ethyl pentadiene, 1, 5, heptatriene 1, 3, 5, benzene, decyne-4, diallylene, 1 methyl 2 tertiary butyl benzene, 1 phenyl pentediene 1, 3, 1, 1, 2 tri methyl cyclopropane, cyclopentane, 1, 2, 3, 4 tetramethyl cyclohexane, 4 methyl cyclohexane. It is seen that any hydrocarbon material which contains a substantial, and preferably a major portion of hydrocarbon boiling approximately between 50° and 130° C., and preferably between 60° C. and 100° C. would be suitable when used in a percentage between the critical limits ⅜% to 1.6% in an alcoholic solution containing between 5% and 15% of a glycol type solvent.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

I claim:

1. A solvent adapted for use in direct process duplication of characters or designs formed of water and alcohol soluble dye, said solvent comprising ethyl alcohol, from approximately 5% to 15% by volume of a glycol type solvent, and from approximately ⅜% to 1.6% by volume of a hydrocarbon composition soluble in the alcohol-glycol mixture and comprising a substantial hydrocarbon portion boiling within the range of approximately 50° to 130° C.

2. A solvent adapted for use in direct process duplication of characters or designs formed of water and alcohol soluble dye, said solvent comprising ethyl alcohol, methyl alcohol, from approximately 5% to 15% by volume of a glycol type solvent, and from approximately ⅜% to 1.6% by volume of a hydrocarbon composition soluble in the alcohol-glycol mixture and comprising a substantial hydrocarbon portion boiling within the range of approximately 50° to 130° C.

3. A solvent adapted for use in direct process duplication of characters or designs formed of water and alcohol soluble dye, said solvent comprising ethyl alcohol, from approximately 5% to 15% by volume of a glycol type solvent, and from ⅜% to 1.6% by volume of a petroleum distillate, the major portion of which boils between 50° to 130° C.

4. A solvent adapted for use in direct process duplication of characters or designs formed of water and alcohol soluble dye, said solvent comprising ethyl alcohol, from approximately 5% to 15% by volume of a glycol type solvent, and from ⅜% to 1.6% by volume of aviation gasoline.

JOHAN BJORKSTEN.